May 11, 1954

F. K. FORMIS 2,677,895

COMPASS COMPENSATING DEVICE

Filed Jan. 5, 1953

INVENTOR.
FREDERICK K. FORMIS.
BY
Lockwood, Galt, Woodard & Smith
ATTORNEYS.

Patented May 11, 1954

2,677,895

UNITED STATES PATENT OFFICE 2,677,895

COMPASS COMPENSATING DEVICE

Frederick K. Formis, Chattanooga, Tenn.

Application January 5, 1953, Serial No. 329,591

6 Claims. (Cl. 33—225)

This invention relates generally to compasses, and more particularly to compasses adapted for use in automobiles, ordnance vehicles such as tanks, power boats or ships having various metallic structures which tend to disturb the magnetic field in the vicinity of the compass, rendering it inaccurate.

When a magnetic compass is mounted in an automobile, tank, or a power boat or ship, it is found that metallic objects in the vicinity of the compass disturb the earth's magnetic field sufficiently to cause deflection of the compass, whereby it provides a false indication of direction. Variation of the degree of deflection of the compass occurs as the automobile or boat is headed in different directions. Therefore, it is necessary to provide compensating magnetic structure adjacent to the compass card which can be adjusted to provide variable compensating magnetic deflecting forces on the compass card as the automobile or boat is headed in different directions. Such compensating magnetic structure takes various forms, but in every case the adjustment of this variable compensating magnetic structure is complex and requires the services of an expert in this line of work.

Accordingly, it is the principal object of this invention to provide a compensating magnetic structure for compasses, which provides substantially infinite variation of magnetic compensation, and which can be adjusted by a relatively unskilled person.

Another object of this invention is to provide a compensating magnetic structure for compasses consisting of a plurality of magnets, each of which may be adjusted in its polar relation to the compass card, and each of which may be adjusted bodily toward or away from the compass card.

In accordance with this invention there is provided a compensating magnetic structure for cooperating with a compass card comprising a plurality of magnets, each of which has a universal mounting whereby it may be adjusted as to polarity with respect to the compass card and with respect to distance away from the compass card.

The full nature of the invention will be understood from the accompanying drawings and the following description and claims:

Fig. 1 of the drawings is a side elevation of a compass including the compensating structure of this invention.

Fig. 2 of the drawings is a side elevation of the compass body showing the compensating magnetic structures.

Figure 1:
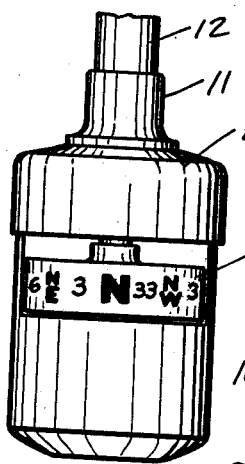
Figures 2, 3:
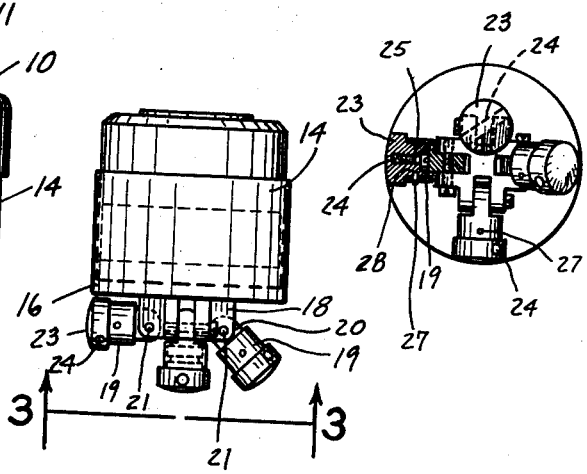
Fig. 3 is a bottom plan view taken from the direction indicated by line 3—3 of Fig. 2.
Figure 4:
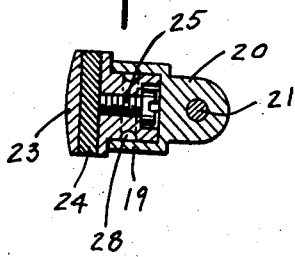
Fig. 4 is an enlarged cross sectional view of one of the compensating means, taken on a plane 90° from that shown in Fig. 3.

Referring to Fig. 1 of the drawings, there is provided a compass adapted to be used in automobiles, power boats or ships comprising a casing having a hanger portion 10 which includes a neck 11 threaded internally to be supported from a bracket 12 with its longitudinal axis disposed vertically. The portion 10 of the casing also provides hanging support for a conventional compass structure 14 which consists generally of a compass card supported in fluid on a pin point bearing. Since this structure forms no part of this invention, it is not described in detail. As in conventional compasses, one or more bar magnets may be supported by the compass card for causing it to indicate the direction of magnetic north.

In accordance with this invention there is provided a compensating magnet structure attached to the bottom 16 of the non-magnetic casing which encloses the compass 14. This supporting structure is also non-magnetic and comprises hangers 18 which may be formed integrally with the bottom 16 of the compass casing. Pivotally mounted on hangers 18 are magnet supporting members 19 which include ears 20 adapted to project between hangers 18 and receive pivot pins 21. Thus, the members 19 may be pivoted about the horizontal axes provided by pivot pins 21. Members 19 may be hollow cylinders for receiving rotatable buttons 23, each of which includes an enlarged head portion within which may be supported bar magnets 24 for rotation about the longitudinal axes of member 19. Bar magnets 24 may be fastened within the heads of buttons 23 by means of set screws, such for example as 25. For retaining buttons 23 within cylindrical members 19 there is provided pressed-in pin members 27 which project into annular grooves 28 cut in the outer surfaces of the shank portions of the buttons 23. Thus, buttons 23 may be rotated within members 19 to orient the bar magnets with respect to the compass card, thereby to change their magnetic polar relation thereto.

Figure 5:
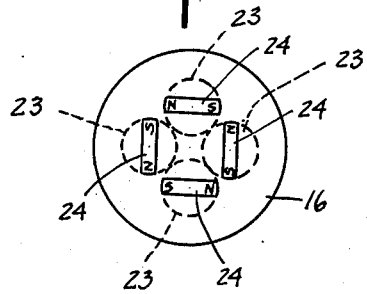
Fig. 5 is a diagram illustrating the compensating magnets in position to "free" the compass.

In operation the compass may be mounted in a pre-selected position within an automobile, tank, power boat or ship, after which the automobile, boat or ship may be headed in different directions to obtain the direction indications of the compass in these various directions. It is important at the time the compass is mounted within the vehicle or at the time it is desired to compensate the compass to "free" the compass of any magnetic influence of the compensating magnet structure. In the prior art compensating structures adapted to be used in automobiles or tanks or other vehicles having adjacent magnetic structure the compensating magnets have such a pronounced magnetic effect on the compass card that they create a drag on the main card magnets whereby accurate compensation or correction is substantially impossible. In other words, conventional compensating structures are so strong magnetically that it is impossible to "free" the compass. Therefore, the initial step in applying the compensating structure of this invention is to turn each of the button assemblies 19, 23 downwardly where the supporting members 19 are in a vertical position and the bar magnets 24 are in a horizontal position. Each of the bar magnets may then be turned to such a position that the north pole of one bar is adjacent to the south pole of its neighboring bar magnet as shown in Fig. 5. In this position the magnetic circuit is in effect closed, and the adjacent north, south poles of the respective magnets neutralize the magnetic effects of one another. This procedure "frees" the compass and if the compass does not point to true north in each heading of the automobile, boat or ship, the support members 19 may be pivoted about pivot pins 21, and at the same time the bar magnet supporting buttons 23 may be rotated to change the magnetic polar relationship of each bar magnet to the compass card. By cut and try methods the compass may be compensated for each heading of the automobile, boat or ship so that it will provide an accurate indication of such heading, regardless of its particular direction.

From the foregoing description it will appear that this invention comprises compass compensating mechanism which is easily adjustable and adequate to provide accurate compensation. While the description shows a compensating device consisting of four magnets, it will be obvious that more or fewer magnets may be utilized, depending upon the requirements of a particular installation. This invention is particularly adapted for use in ordnance vehicles such as tanks or other vehicles, boats or ships, wherein the compass must necessarily be mounted in relatively close magnetic relationship to metallic housings and electrical equipment such as radio apparatus and electrical motors or the like.

The invention claimed is:

1. In a compass comprising a casing and a compass card bearing a magnet, a compensating structure comprising a plurality of spaced horizontal pivot supports depending from the bottom of said casing in angular relation to one another, a hollow cylindrical member pivotally mounted on each of said supports for angular adjustment in a vertical plane, a button rotatably mounted in each cylindrical member, and a bar magnet mounted in each button for rotation about the longitudinal axis of said cylindrical member, whereby each bar magnet may be adjusted about a horizontal pivot support and may also be rotated into different polar relationships with said card magnet.

2. In a compass comprising a casing and a compass card bearing a magnet, a compensating structure comprising a plurality of spaced supports depending from the bottom of said casing, a hollow cylindrical member movably mounted on each of said supports for adjustment in a vertical plane, a button rotatably mounted in each cylindrical member, and a bar magnet mounted in each button for rotation about the longitudinal axis of said cylindrical member, whereby each bar magnet may be adjusted vertically and may also be rotated into different polar relationships with said card magnet.

3. A compass comprising a casing having a compass card bearing a magnet and rotatable about the longitudinal axis of said casing, a plurality of compensating magnet supporting members spaced about said axis and pivotally mounted on said casing on axes disposed at right angles to said longitudinal axis, a button mounted on each of said members and each button being rotatable on an axis in said member at right angles to its respective pivot, and a bar magnet carried by each button disposed transversely of said last named axis.

4. A compass comprising a casing having a compass card bearing a magnet and rotatable about the longitudinal axis of said casing, a plurality of supporting members spaced about said longitudinal axis and pivotally mounted on said casing independently of one another on axes disposed at right angles to said longitudinal axis, a button mounted on each of said members each button being rotatable on an axis in said member at right angles to its respective pivot, and a bar magnet carried by each button and disposed transversely of said last named axis.

5. A compass comprising a casing having a compass card bearing a magnet and rotatable about the longitudinal axis of said casing, a plurality of supports on said casing spaced around the said longitudinal axis and from one another, a compensating magnet supporting member pivotally mounted at one end to each of said supports and movable on said pivots independently of one another on axes disposed at right angles to the longitudinal axis of said member, a button mounted on each of said members each rotatable on an axis at right angles to its respective pivot, and a bar magnet carried by each button disposed transversely of the longitudinal axis of said casing.

6. A compass comprising a casing having a compass card bearing a magnet and rotatable about the vertical axis of said casing, a plurality of supports depending from said casing spaced from one another and around said axis, a compensating magnet supporting member pivotally mounted at its inner end to each of said supports on a horizontal axis, a button on each of said supporting members rotatable on an axis at right angles to its respective pivot, and a bar magnet carried by each of said buttons and disposed thereon at right angles to the said vertical axis of said casing.

References Cited in the file of this patent
UNITED STATES PATENTS

| Number | Name | Date |
|---|---|---|
| 2,417,864 | Dinsmore | Mar. 25, 1947 |